Patented Aug. 29, 1950

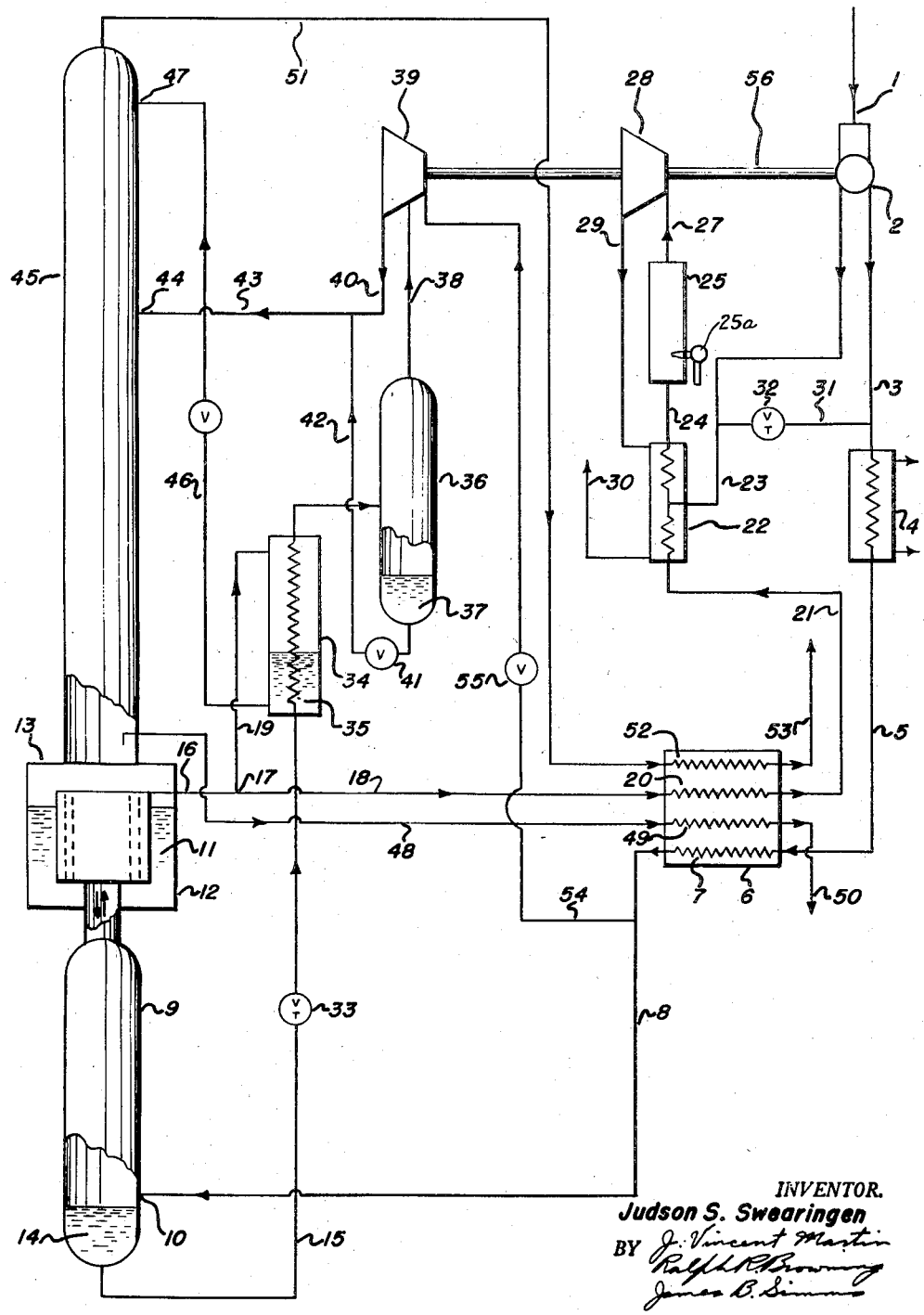

2,520,862

UNITED STATES PATENT OFFICE 2,520,862

AIR SEPARATION PROCESS

Judson S. Swearingen, San Antonio, Tex.

Application October 7, 1946, Serial No. 701,725

9 Claims. (Cl. 62—123)

This invention relates in general to the separation from gaseous mixtures of certain constituents thereof and has for its general object provision of a method and apparatus for such separation in which, although it is necessary to compress the gaseous mixture, a substantial portion of the energy required for compression of the gaseous mixture will be recovered.

One currently employed method of separating certain gaseous constituents from gaseous mixtures, as for example in the separation of oxygen from air, consists in the compression of the air to a pressure of about 5 or 6 atmospheres, cooling the thus compressed air in suitable heat exchangers to a temperature near its liquefying temperature or its dew point, subjecting at least a portion of it to fractional distillation, returning to the aforesaid heat exchangers at near atmospheric pressure the gaseous residue for the purpose of recovering its refrigeration content, and then discharging such residue to the atmosphere. It is customary to discharge such gaseous residue at somewhere near atmospheric pressure so as to minimize the pressure to which the incoming air stream must be pressurized.

It is an object of this invention to provide a method and apparatus whereby this pressure energy in the residue gas is more efficiently used to separate oxygen from the air and for similar separation processes.

Still another object of this invention is to provide a cheaper apparatus than heretofore employed for extracting oxygen from the air.

Another object of this invention is to provide a method and apparatus for extracting oxygen from the air which utilizes the air residue as a prime mover fluid for the operation of the compressor used in compressing the incoming stream of air.

Another object of this invention is to provide a method and apparatus for the separation of oxygen from the air in which a large portion of the cold air residue returned to the heat exchanger is at an elevated pressure.

Another object of this invention is to provide a method and apparatus for the separation of oxygen from the air in which the stream of gas passing through the compressors and turbines of the device are of such volume and are subjected to such pressure changes as favor high efficiency operation in the compressors and turbines.

Still another object of this invention is to provide a method for separation of oxygen from the air in which the expander which supplies the refrigeration normally operates on a gas stream which is available at a pressure lower than any of the primary pressurized air streams; so that the expander may be switched to operate on the higher pressure of the primary pressurized air streams during the start-up period thereby generating more refrigeration.

Other objects and advantages of this invention will become apparent from the following description taken in connection with the accompanying drawings wherein is set forth by way of illustration one embodiment of this invention.

In the drawings the single figure illustrates a flow diagram of a process and apparatus constructed in accordance with the present invention for separating oxygen from the air.

Referring more in detail to the drawings, atmospheric air is taken into the plant illustrated at point 1, and after being compressed by a compressor 2 a portion thereof is discharged through the line 3 at a pressure preferably in the neighborhood of 5 or 6 atmospheres. This is the portion of air taken into the plant which is to be processed for the extraction of oxygen.

The air passing through the line 3 is conducted through an after cooler 4 where some of the heat of compression is removed, and thence through the line 5 to a compound or multiple heat exchanger 6. The heat exchanger 6 is provided with a suitable conduit 7 for the conduction of this air in one direction which, as indicated by arrows in the drawing, is shown as being from right to left. In the heat exchanger 6, as will be hereinafter more fully explained, this compressed air passes countercurrently with respect to three other streams of much cooler media so that it is very greatly cooled, and it leaves the heat exchanger 6 through a line 8 at approximately —275° F. which for the pressure indicated is just above its liquidation or dew point.

The thus cooled and compressed air is conducted to an enriching column 9 which it enters at a point 10 adjacent but above the lower end thereof. Thence, it passes upwardly through this column and through a relatively narrow neck at the upper end thereof into a reboiler 11, where a substantial amount of heat is absorbed from the gas thereby producing a condensate, and this condensate in turn flows as a reflux back down through the column 9 contacting the rising gases and serving to denude them of oxygen. In the reboiler the gases are cooled by a transfer of heat from them to a body of liquid oxygen rich mixture 12 within the container 13. The oxygen rich fraction resulting from the denuding of the rising gases within the column 9 is collected at the lower end of this column as shown at 14 and drawn off through a line 15 at the bottom of the column.

The lean gaseous residue of this separation step, still further denuded of oxygen by the partial condensation in the reboiler, is drawn off at the upper end of the reboiler to a line 16 which is caused to branch at the point 17 into a line 18, which preferably conducts the major portion of this gaseous residue, and a line 19 which conducts a minor portion thereof. Due to the cooling in the reboiler, this residue gas leaving the reboiler will be at a lower temperature than the air entering the enricher 9. In the case of temperatures and pressure such as already given this residue would be at approximately —285° F., and still at a pressure only very slightly lower than that at which the air entered the enricher 9. The optimum amount of this residue air drawn off through the line 18 represents about half of the air take into the system through the line 1.

Following the major portion of the gaseous residue first, it will be seen that it is conducted back to the heat exchanger 6 where it passes through a suitable conduit 20 in a direction countercurrently to the conduit 7 through which the incoming air stream passes. The gaseous residue being at a much lower temperature than the incoming air stream serves to extract heat from the incoming air stream and to become heated. It is then conducted through a line 21 to a heat exchanger 22 in which it is still further heated by a means presently to be referred to, and in which it may be mingled with unseparated air supplied through a line 23 from an intermediate stage of the compressor 2. This mingling of the residue gas with the air stream from line 23 serves to substantially increase the volume and the oxygen content of the stream passing out of the heat exchanger 22 and through the line 24 to the heater 25, where it is heated to a temperature preferably well over 1000° F., which will in turn increase its volume to about three times its volume at compressor temperature. Being heated to three times its original volume, and constituting in amount about one-half (½) the original intake of air, the residue gas alone would theoretically have an available energy content approximately one and one-half (1½) times that required to compress the incoming air. But since most turbines and compressors are not efficient enough to operate on this margin of fifty percent (50%), the additional power required may be supplied by the heating of the additional air coming in through the line 23.

The addition of unseparated air is highly desirable, not only because of the fact that it produces an additional amount of gas, for subsequent expansion, but because of the fact that it produces a gaseous stream, having sufficient oxygen to support combustion. This addition of unseparated air also makes it possible to place a burner 25a within the stream of gas passing through heater 25 and to cause combustion to take place within the stream, such combustion being supported by the oxygen within the stream so that the heating may take place without wastage. The gaseous mixture then passes through the line 27 into the turbine or other form of expansion engine 28 wherein it is expanded substantially to atmospheric pressure while doing mechanical work. The exhaust from the turbine 28 passes through a line 29 back to the heat exchanger 22, wherein it gives off a substantial portion of its remaining heat to the gaseous stream approaching the heater 25. Thereupon it is exhausted to the atmosphere through the line 30. Thus the turbine 28 is made to produce sufficient or nearly sufficient mechanical work to operate the compressor 2.

In the event that the compressor 2 is of such a type that no intermediate stage is available for supplying air through the line 23, such air may be separated from the stream of air going through the line 3 before the same reaches the after cooler 4, and may be conducted through a line 31 and a suitable throttle valve 32 to the line 23. The throttle valve 32 is necessary because the gas after passing through the various heat exchangers and the enriching column is at a somewhat lower pressure than that originally supplied by the high pressure side of the compressor 2.

Returning now to the oxygen rich stream of liquid fraction withdrawn from the lower end of the column 9, it will be seen that this fraction is made to pass through the throttle valve 33 on its way upwardly to a heat exchanger 34. In this heat exchanger 34 the oxygen rich stream is passed in heat exchange relation with that portion of the leaner residue conducted upwardly through the line 19 to the upper end of the heat exchanger 34. The valve 33 is so adjusted that it will effect a pressure reduction in the oxygen-rich stream such that such stream can partially vaporize in the heat exchanger and absorb heat from the leaner residue gas. This lower pressure will be in the neighborhood of 3 or 4 atmospheres. The portion of residue gas coming through the line 19 is so regulated that it will all be liquefied upon evaporation of a desired portion of the oxygen-rich stream coming in from the throttle valve 33, and in practice it has been found desirable that the portion thus evaporated be approximately fifty percent (50%). This liquid condensate produced by condensation of the residue air stream is collected from the lower end of the heat exchanger as indicated at 35.

The mixed liquid and vapor of the oxygen-rich fraction from the heat exchanger 34 passes upwardly into the gas and liquid separator 36, wherein the liquid oxygen-rich fraction is collected at the lower end as shown at 37, while the vapor from this oxygen rich fraction, which vapor contains the energy added in the heat exchanger 34, passes out through a line 38 from the upper end of the separator 36 and into the turbine or expansion engine 39, where it is allowed to expand while doing mechanical work. This oxygen-rich gaseous portion passes out of the turbine or expansion engine 39 through a line 40 while the liquid portion of the oxygen-rich fraction passes from the lower end of the separator 36 through a suitable pressure reducing valve 41 and the line 42 to be mixed with the gaseous portion of this fraction and pass through line 43 to the point 44 where it empties into the tower 45.

Meanwhile, the liquid portion of the oxygen lean residue collected at 35 in the heat exchanger 34 is drawn off through a line 46 and passes through a suitable valve to the point 47 where it empties into the tower 45 adjacent to the upper end thereof. The valve just referred to is preferably employed in such a manner as to limit the flow of residue gas through the separator 34 to such extent that all of such gas will be liquefied in the heat exchanger 34 and only liquid will pass into the tower 45 at the point 47.

The downcoming liquid from the point 47 will be brought into contact with the at least partly vaporized oxygen-rich fraction entering the tower at the point 44 with the result that the oxygen will be absorbed and concentrated in liquid form at 12 around the reboiler 11. The tower 45 will serve as a fractionating tower and due to the action of the reboiler this liquid will be vaporized, the lighter fractions rising and passing on toward the upper end of the column 45, while the heavier oxygen will be drawn off through the line 48. This oxygen will be conducted through the line 48 to the section 49 of the heat exchanger 6 where it will pass through the heat exchanger countercurrently with respect to the passage of the original compressed air coming into the plant. The oxygen product will then be drawn off at 50.

Meanwhile, the residue air vapor consisting of the lighter fractions boiling off from the liquid body 12 will be carried out through the line 51 and through the section 52 of the heat exchanger 6, again countercurrently with respect to the flow of the original air, so as to give up to the original air considerable of its refrigeration, after which it may be vented to the atmosphere through the line 53.

The heat removed from the rectifying system by the turbine or expander 39 may be insufficient to produce the refrigeration necessary to perpetuate the process, and if so, additional pressurized air from the line 8 may be introduced through the line 54 and the valve 55 to the turbine 39. The vapor in the line 38 is very nearly the same composition as the air, so the two streams may be mixed in the expander 39 and then discharged through a common line 40. This supplementary air is partially condensed and so increases the liquid reflux below the feed point 44 in the column 45, the air, of course, being about one-fifth (⅕) oxygen. These advantages and some increase in power from the expander 39 help to offset the consumption of pressurized air from the line 8. The adaptability of the system to this means of adding additional refrigeration to the system without extra equipment constitutes an additional advantageous and novel feature of this invention.

Upon starting up the plant it is desirable also to increase the rate of refrigeration, and this may be accomplished by merely opening the throttle valve 33. This subjects the expander or turbine 39 to the full pressure in the line 8 since at the start there is no liquid at 14 or in the line 15 to be vaporized. This high pressure develops greater power in the expander 39 and removes an amount of heat equivalent to the power generated. This additional advantage of this invention results from the fact that efficient operation is attained in the cycle with the operation of the expander at this low pressure so that the above described increased rate of refrigeration during starting up is available.

The mechanical work produced by the turbines 28 and 39 may be transmitted, to the compressor 2 by the shaft 56 or any other suitable form of energy transmitting connection. Also any form of expansion engine other than turbines may be employed if desired.

As will be obvious to those skilled in the art, there are numerous devices and controls for attainment of further heat economy which may be considered the equivalent of those illustrated and which may be optionally used, but which have not been illustrated or described in the interest of simplicity.

Similarly, it will be obvious that there are numerous ways equivalent to those illustrated in which an auxiliary expander may operate to supply additional refrigeration into the system.

While the system described is particularly adapted to the separation of oxygen from air, it will be obvious that it may be employed for the separation of certain constituents from other mixtures of gases.

From the foregoing it will be apparent that a method and apparatus has been provided which is capable of accomplishing all of the objects and advantages sought by this invention.

Having described my invention, I claim:

1. An apparatus for separating and recovering oxygen from air comprising a compressor and cooler combination of a capacity sufficient for receiving the air and compressing and cooling it to a pressure of approximately 5 or 6 atmospheres and a temperature near its dew point, an enriching apparatus having its intake connected to receive the mixture from said combination and extract from it and separately discharge a fraction rich in oxygen and a gaseous residue lean in oxygen, the latter at a pressure approximating the pressure of the air entering the enriching apparatus and a temperature near the dew point for such residue, a heater connected to said enricher capable of receiving and heating said gaseous residue without substantial drop in pressure to increase its energy content, an expansion engine connected to receive said heated mixture and expand the same to produce mechanical work, work transmitting means connecting said engine and said compressor for transmitting said work to and applying it toward the operation of said compressor, and a heat exchanger for extracting residue heat from the expanded exhaust gas from said expansion engine and transferring such heat to the gaseous mixture approaching said engine prior to the final heating of said mixture.

2. An apparatus for separating and recovering oxygen from air comprising a compressor for compressing the air, means for extracting from the compressed air a fraction rich in oxygen and discharging the gaseous residue at a pressure higher than the pressure of the original uncompressed air, means for injecting into said gaseous residue as it leaves said plant a charge of compressed substantially uncooled whole air to increase the oxygen content of the gaseous residue, a burner within the stream of oxygen enriched gaseous residue for burning fuel within said stream to heat the same and increase its energy content, an expansion engine connected to receive said heated mixture and expand the same to produce mechanical work, and work transmitting means connecting said engine and said compressor for transmitting said work to and applying it toward the operation of said compressor.

3. An apparatus for separating and recovering oxygen from air comprising a compressor for compressing the air, means for extracting from the compressed air a liquid fraction rich in oxygen leaving a gaseous residue, an adjustable throttling means for receiving said liquid oxygen rich fraction from said extracting means and passing it into a zone of lower pressure, a heat exchanger for transferring a portion of the heat from part of said gaseous residue to the said oxygen rich fraction to evaporate a portion of said oxygen rich fraction and liquefy the said part of the gaseous residue, a gas and liquid separator for separating the liquid and gaseous portions of said oxygen rich fraction, an expansion engine for receiving and expanding said last mentioned gaseous portion to produce mechanical work, gas and liquid contact apparatus for receiving and causing an intimate contact between the liquified portion of the residue gas and both portions of the oxygen rich fraction to produce a liquid portion still richer in oxygen, and means for withdrawing said last mentioned oxygen rich portion.

4. An apparatus for separating and recovering oxygen from air comprising an air compressor, an extracting plant for extracting from the compressed air a fraction rich in oxygen and leaving a gaseous residue, means for expanding said fraction rich in oxygen to refrigerate said plant, and means for supplying additional quantity of compressed cooled unseparated air to said expander to produce additional refrigeration during a starting up period.

5. The method of extracting oxygen from air which comprises compressing the air to approximately 5 or 6 atmospheres, cooling the air thus compressed to a temperature adjacent to its dew point, separating an oxygen rich liquid fraction from the thus cold pressurized stream of air, warming the residue of the pressurized air without substantially reducing its pressure by first bringing it into heat exchange relation with the incoming compressed air to extract heat therefrom and then applying heat from an external source to raise said residue to approximately 1000° F., and expanding the heated residue while causing it to do mechanical work to recover a portion of the energy of compression.

6. The method of extracting oxygen from air which comprises compressing the air to approximately 5 or 6 atmospheres, cooling the air thus compressed to a temperature adjacent to its dew point, separating an oxygen rich liquid fraction from the thus cold pressurized stream of air, warming the residue of the pressurized air without substantially reducing its pressure, by first bringing it into heat exchange relation with the incoming compressed air to extract heat therefrom, then mixing it with a portion of unseparated air to increase the oxygen content of the mixture, and then burning a fuel in the stream of gaseous mixture, and expanding the heated mixture while causing it to do mechanical work to recover a portion of the energy of compression.

7. A method of extracting oxygen from air which comprises compressing the air to approximately 5 or 6 atmospheres, cooling the air to a temperature adjacent its dew point, separating an oxygen rich liquid fraction from the thus cold pressurized stream of air, passing said liquid fraction into a zone of lower pressure than the zone in which it was separated from the air, bringing it into heat exchange relationship with a portion of the gaseous residue resulting from said separation to cause it to take up heat from said portion of the residue and liquefy the said portion while partially evaporating the oxygen rich fraction, separating the gaseous and liquid portions of said oxygen rich fraction, expanding the gaseous portion of said oxygen rich fraction to cause it to do mechanical work, and bringing both portions of the oxygen rich fraction into intimate contact with the liquified portion of the residue from the initial separation to fractionally distill said gaseous and liquid portions of said oxygen rich fraction to produce a portion still richer in oxygen.

8. A method of extracting oxygen from air which comprises compressing the air to approximately 5 or 6 atmospheres, cooling the air to a temperature adjacent its dew point, separating an oxygen rich liquid fraction from the thus cold pressurized stream of air, passing said liquid fraction into a zone of lower pressure than the zone in which it was separated from the air, bringing it into heat exchange relationship with a portion of the gaseous residue resulting from said separation to cause it to take up heat from said portion of the residue and liquefy the said portion while partially evaporating the oxygen rich fraction, separating the gaseous and liquid portions of said oxygen rich fraction, expanding the gaseous portion of said oxygen rich fraction to cause it to do mechanical work, bringing both portions of the oxygen rich fraction into intimate contact with the liquified portion of the residue from the initial separation to fractionally distill said gaseous and liquid portions of said oxygen rich fraction to produce a portion still richer in oxygen, and expanding a portion of unseparated cooled compressed air with the gaseous portion of the oxygen rich fraction to produce additional refrigeration for promoting the subsequent concentration of oxygen.

9. An apparatus for separating and recovering from a gaseous mixture one of its constituents comprising a compressor for compressing the mixture, means for extracting from said compressed mixture a fraction rich in the constituent to be recovered and leaving a gaseous residue, and means for expanding said fraction rich in the constituent to be recovered to refrigerate said plant, and means for supplying an additional quantity of compressed cooled unseparated gaseous mixture to said expander to produce additional refrigeration during a starting up period.

JUDSON S. SWEARINGEN.

REFERENCES CITED

The following references are of record in the file of this patent:

UNITED STATES PATENTS

| Number | Name | Date |
|---|---|---|
| 1,264,399 | Jones | Apr. 30, 1918 |
| 1,489,395 | Norton | Apr. 8, 1924 |
| 1,537,193 | Roberts | May 12, 1925 |
| 1,620,192 | Claude | Mar. 8, 1927 |
| 2,242,299 | Harrington et al. | May 20, 1941 |